UNITED STATES PATENT OFFICE.

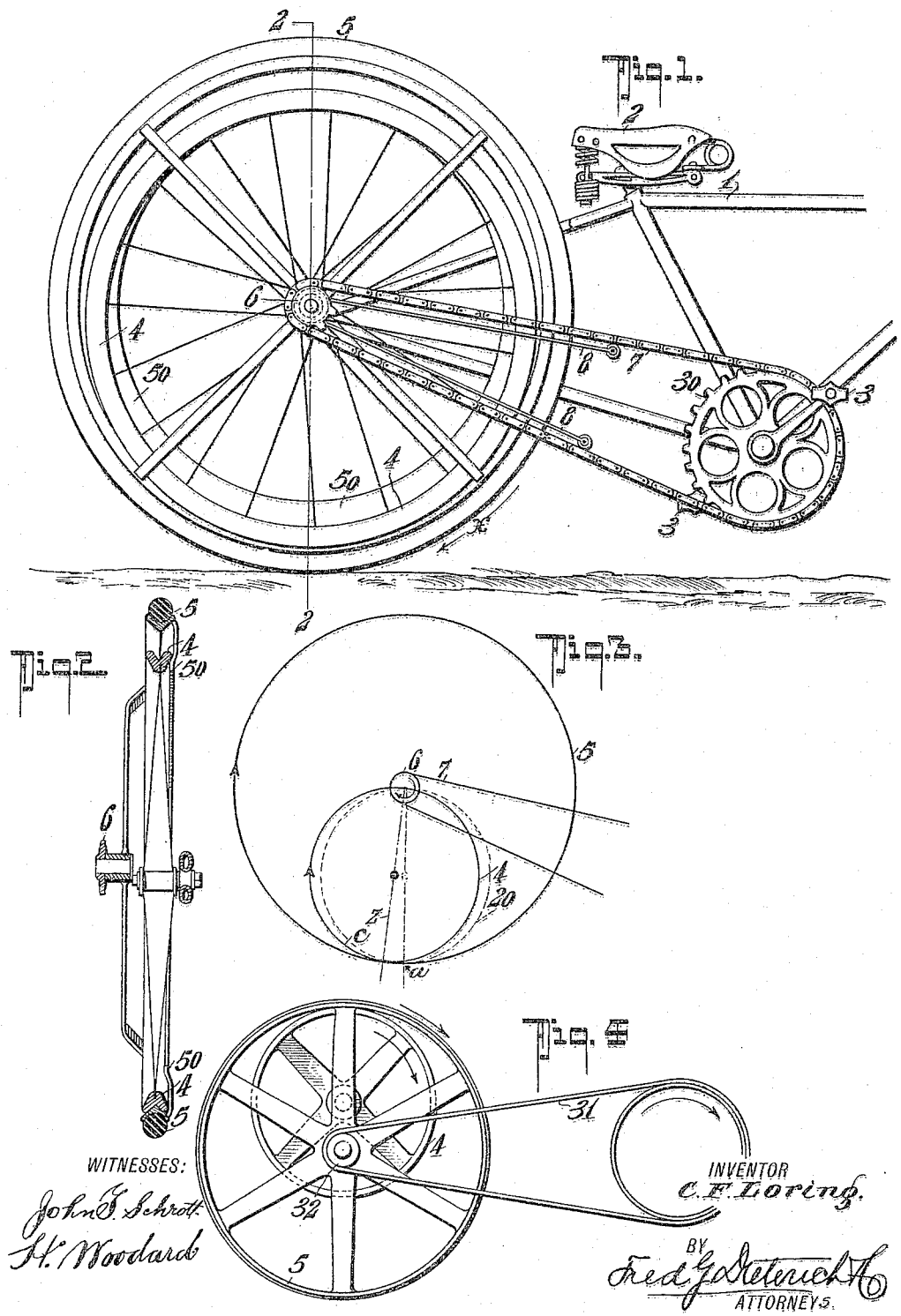

CHARLES FRANKLIN LORING, OF RENO, NEVADA.

GEARING.

1,168,522.  Specification of Letters Patent.  Patented Jan. 18, 1916.

Application filed April 30, 1913. Serial No. 764,527.

*To all whom it may concern:*

Be it known that I, CHARLES F. LORING, residing at Reno, in the county of Washoe and State of Nevada, have invented a new and Improved Gearing, of which the following is a specification.

The invention has for its object to provide a convenient driving mechanism especially adapted for use in connection with bicycles, motor cycles, and the like.

With other objects in view that will hereinafter appear my invention consists of a power mechanism that embodies the peculiar arrangement and combination of parts, all of which will be hereinafter explained, specifically pointed out in the appended claims, and illustrated in the accompanying drawing, in which:

Figure 1 is a diagrammatic side elevation of a bicycle structure in which is embodied my invention. Fig. 2 is a cross section thereof on the line 2—2 on Fig. 1, looking in the direction of the arrow. Fig. 3 is a diagram hereinafter specifically referred to. Fig. 4 is a diagrammatic side view of a slightly modified form of my invention.

In the showing of my invention in the accompanying drawing, I have indicated the same as embodied in a "safety bicycle" structure, and in the said showing (see Figs. 1 and 2) 1 designates a portion of the conventional form of frame; 2 the seat, 3 the driving cranks and 4 a rear wheel which in the practical application of my invention is a shiftable body that transmits the weight of the bicycle to the power transmitting wheel 5, which so far as the structure shown in Figs. 1 and 2 of the drawing is concerned, will be the rear bicycle or driving wheel.

The driving or propeller wheel 5 carries an axial sprocket 6 over which passes the endless chain 7 that connects it with the crank sprocket 30.

The inner wheel in Figs. 1 and 2 is shown as being of but a slightly less diameter than the outer or propelling wheel but the relative diameters of the said inner wheel 4 and the outer or propelling wheel 5, may be varied, even to the extent of making the inner of but half of the diameter (or less) of the outer wheel (see diagram Figs. 3 and 4).

The outer or propelling wheel 5 is in the nature of a "floater" that is, it is independent of the framing that supports the inner wheel, and in practice is held from lateral displacement by any suitable means, for example, when used as a part of a bicycle structure, as in Figs. 1 and 2, it has a deep internal annular rim 50 that laps the rim of the inner wheel 4, the said wheel 5 when arranged as in Figs. 1 and 2, being further guided against lateral displacement by the frame 1.

For preserving the tension of the sprocket or driving chain spring arms 8—8 that project from the frame 1 to engage the chain, as shown in Fig. 1, may be used.

Fig. 3 shows diagrammatically the relation of the parts. The dotted lines 20 indicate the initial position of the inner wheel 4 with the point of contact $a$ directly beneath the sprocket 6, while the full lines $c$ indicate the position of the wheel 4 when power is applied to the wheel 5, at which time the point of contact between the wheels 4 and 5 lies in a line $z$ connecting the center of the wheel 4 with the initial center of the wheel 5.

In operation when power is applied to the pedals 3, the direct action is to turn the wheel 5, causing the wheel 4 to run around the inner rim of the wheel 5 and to drive the frame 1 forwardly, the turning movement of the wheel 5 when driving power is applied to the pedal 3 being in the direction of the arrow $x$ in Fig. 1.

For driving mechanism, other than a vehicle, as in Figs. 1 and 2, and particularly where the inner wheel is in suspension (see diagram Fig. 4) the frictional contact between the inner and outer wheels may be obtained by supporting the outer wheel 5 upon the inner wheel, making the said outer wheel of such weight as the conditions may require for the effective coöperation of the two wheels.

When thus utilized any initial motive power may be used and the same coupled by a belt 30 with a puller 31 on the outer wheel.

What I claim is:

1. In a power transmitting mechanism of the character stated, a frame, an inner wheel having a peripheral groove and relatively fixed journaled in said frame, a driving member, an outer wheel having an inner rim to receive said inner wheel, a driving element on said outer wheel and a power transmitting connection between said driving element of said outer wheel and said driving member, said outer wheel having its axis independent of the pivotal axis of the inner wheel, substantially as shown and described.

2. In a power transmitting mechanism, an outer driving wheel, an inner driven wheel having a peripheral groove, said outer driving wheel having an inner rim to project into the said groove, an initial driving element, a power transmitting connection between said initial driving element and said outer wheel, a rigid body on which said initial driving element is fixedly journaled, and means for holding said inner and outer wheels in the same plane.

CHARLES FRANKLIN LORING.

Witnesses:
MILO C. McMILLAN,
H. LEWERS.

Copies of this patent may be obtained for five cents each, by addressing the "Commissioner of Patents, Washington, D. C."